US012011937B2

(12) United States Patent
Weismantel

(10) Patent No.: US 12,011,937 B2
(45) **Date of Patent: *Jun. 18, 2024**

(54) REPLICATION ALIGNMENT OF COMPONENTS FOR USE IN INKJET PRINTING APPLICATIONS

(71) Applicant: Electronics for Imaging, Inc., Londonberry, NH (US)

(72) Inventor: John A. Weismantel, Gilford, NH (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,065

(22) Filed: May 18, 2023

(65) Prior Publication Data

US 2023/0286304 A1 Sep. 14, 2023

Related U.S. Application Data

(60) Continuation of application No. 17/203,282, filed on Mar. 16, 2021, now Pat. No. 11,691,446, which is a continuation of application No. 16/701,630, filed on Dec. 3, 2019, now Pat. No. 10,974,528, which is a division of application No. 15/597,433, filed on May 17, 2017, now Pat. No. 10,507,679.

(Continued)

(51) Int. Cl.
*B41J 29/02* (2006.01)

(52) U.S. Cl.
CPC .................................... *B41J 29/02* (2013.01)

(58) Field of Classification Search
CPC ........ B41J 29/02; B41J 2202/21; B41J 19/00; B41J 25/34
See application file for complete search history.

(56) References Cited

U.S. PATENT DOCUMENTS 5,065,489 A 11/1991 Mullen et al.
5,450,101 A 9/1995 Ishida et al.
(Continued)

FOREIGN PATENT DOCUMENTS

EP 2969570 A1 1/2016
JP 2003159804 A 6/2003
(Continued)

*Primary Examiner* — Sharon Polk
(74) *Attorney, Agent, or Firm* — Perkins Coie LLP

(57) ABSTRACT

Techniques for more accurately and efficiently replicating the alignment of one or more printer components with respect to another printer component are described herein. Replication may be achieved by using a fixture and a connection media to create a near exact replica of features of the fixture, or to temporarily hold multiple printer components in position while a joining layer of the connection media hardens. More specifically, a connection media, such as epoxy, can be used to fill an intentionally-established gap between connecting bodies or components that are held in a predetermined position by the replication fixture. The replication fixture represents a mechanical mounting interface that influences the position of a print head (or an array of print heads) within a printer housing or printing mechanism. Joining printer components in such a manner enables a stable mechanical coupling to be formed that does not require post operations.

20 Claims, 6 Drawing Sheets

Related U.S. Application Data

(60) Provisional application No. 62/340,977, filed on May 24, 2016.

(56) References Cited

U.S. PATENT DOCUMENTS

| | | | | |
|---|---|---|---|---|
| 6,471,335 | B1 | 10/2002 | Gelbart | |
| 6,834,937 | B2 | 12/2004 | Killmeier et al. | |
| 7,322,394 | B2 | 1/2008 | Nakamura et al. | |
| 7,832,086 | B2 | 11/2010 | Inaoka et al. | |
| 11,691,446 | B2 * | 7/2023 | Weismantel | B41J 19/00 347/108 |
| 2005/0157035 | A1 | 7/2005 | Silverbrook et al. | |
| 2011/0223837 | A1 | 9/2011 | Duescher et al. | |
| 2011/0273502 | A1 | 11/2011 | Eun et al. | |
| 2015/0202905 | A1 | 7/2015 | Bigford et al. | |
| 2019/0216648 | A1 | 7/2019 | Belliappa | |

FOREIGN PATENT DOCUMENTS

| | | | |
|---|---|---|---|
| JP | 6091953 | B2 | 2/2017 |
| WO | 2005108097 | A1 | 11/2005 |
| WO | 2015082508 | A1 | 6/2015 |

* cited by examiner

REPLICATION ALIGNMENT OF COMPONENTS FOR USE IN INKJET PRINTING APPLICATIONS

CROSS-REFERENCE TO RELATED APPLICATIONS

This application is a continuation of U.S. patent application Ser. No. 17/203,282, titled "Replication Alignment of Components for Use in Inkjet Printing Applications" and filed on Mar. 16, 2021, now U.S. Pat. No. 11,619,446, which is a continuation of U.S. patent application Ser. No. 16/701,630, titled "Replication Alignment of Components for Use in Inkjet Printing Applications" and filed on Dec. 3, 2019, now U.S. Pat. No. 10,974,528, which is a divisional of U.S. patent application Ser. No. 15/597,433, titled "Replication Alignment of Components for Use in Inkjet Printing Applications" and filed on May 17, 2017, now U.S. Pat. No. 10,507,679, which claims priority to and the benefit of U.S. Provisional Patent Application No. 62/340,977, titled "Replication Alignment for an Inkjet Print Head Mounting" and filed on May 24, 2016, each of which is incorporated herein in its entirety by this reference thereto.

TECHNICAL FIELD

Various embodiments relate to the fabrication of components used in inkjet printing applications. More specifically, various embodiments concern structures for precisely replicating alignment during the fabrication of components used in inkjet printing applications.

BACKGROUND

Inkjet printing is a type of computer printing that recreates a digital image by depositing droplets of ink onto a substrate, such as paper or plastic. Many contemporary inkjet printers utilize drop-on-demand (DOD) technology to force droplets of ink from a reservoir through a nozzle onto the substrate. Accordingly, the mounting and positioning of the reservoir and nozzle (among other components) is critical to accurately depositing drops of ink in the desired position. Together, these components form a print head (also referred to as a "print head assembly").

Inkjet printers must position individual droplets of ink with high accuracy and precision in order to output images of acceptable quality. However, sufficient accuracy and precision are often difficult to achieve using conventional manufacturing techniques, which often result in inconsistent placement of printer components and poor print quality.

There are many possible sources of error that can contribute to inaccurate and/or imprecise droplet positioning. For example, one key contributor is the physical position of each print head with respect to all six degrees of freedom when mounted inside an inkjet printer housing or printing mechanism. The physical position is typically controlled by tight-tolerance machined components, an adjustment mechanism, or both. Moreover, even small errors can result in poor printing quality, particularly if multiple sources of error combine to negatively affect positioning of the droplets on the substrate.

SUMMARY

Techniques for more accurately and efficiently replicating the alignment of one or more printer components (e.g., print heads) with respect to other printer component(s) (e.g., a printer structure or mechanical interface component) are described herein. Said another way, replication fixtures could be used to align the critical features of mechanical printer components relative to other mechanical printer components.

Replication may be achieved by using a fixture and connection media (e.g., an epoxy resin, which is also referred to simply as an "epoxy") to create a near exact replica of features of the fixture, or to temporarily hold multiple components in position while a joining layer of the connection media hardens. Some embodiments of replication fixtures are as simple as holding a small flat plate in position relative to a structure, and then bonding the two pieces together using a connection media.

The replication fixture represents a mechanical mounting interface that influences the position of a printer component within a printer housing or printing mechanism. For example, a replication fixture could be used to securably fix a print head (or an array of print heads) within a printer housing or printing mechanism.

Joining printer components in such a manner does not add or change the stresses within the individual printer components, unlike traditional methods that utilize fasteners (e.g., screws) or welding. Instead, a stable mechanical coupling can be formed that does not require post operations, such as stress relieving. In fact, many printer assemblies can be fabricated using a single replication fixture, and all to the near exact tolerance of the replication fixture. Depending on the specific application requirements, replication assembly techniques can accomplish all or most of the position tolerance requirements without the use of alignment mechanisms. This maximizes assembly accuracy and precision, while minimizing costs and complexity.

A connection media, such as epoxy, can be used to fill an intentionally-established gap between connecting bodies or components that are held in a predetermined position by a replication fixture. The accuracy and precision of the replication fixture can be much higher than that which is possible with the components themselves because the replication fixture can be made from a very stable material, such as granite, normalized steel, ceramic, etc.

Replication fixtures can also be used to produce critical surface features directly from the connection media. For example, a precision flat surface could be created by applying a releasing agent on a replication fixture (e.g., a surface plate), and ejecting the connection media between the replication fixture and mechanical component having course accuracy. Mechanical components having course accuracy (e.g., uneven or inconsistent surfaces) are often produced at low cost. Once the connection media has solidified, the replication fixture can be readily removed, thereby leaving a mechanical component having a surface formed by the connection media that substantially matches the precision surface of the replication fixture. Such a technique can be useful in creating highly accurate/precise surface features that can be used to align, guide, support, etc., other features/components.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
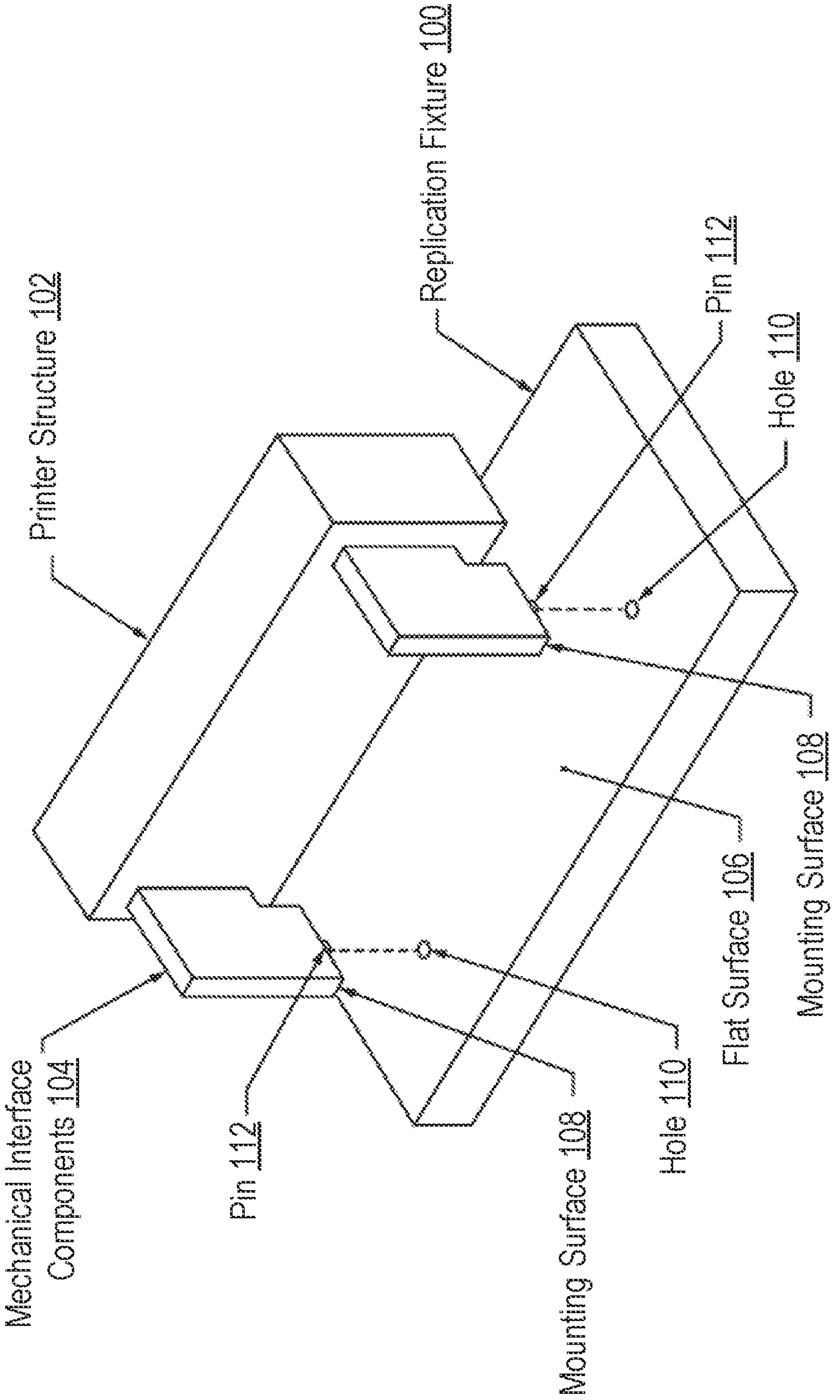
FIG. 1 depicts a replication fixture that can be used to more accurately fabricate a printer assembly that includes a printer structure and one or more mechanical interface components (among other components).

Conventional techniques for fabricating tight-tolerance machined components for a printer (e.g., an inkjet printer) require expensive equipment and long processing times. Yet the tolerance achievable by these techniques is limited by the size of the machined components and the stability of the material during processing. For example, large components are typically more challenging to fabricate with high precision. This results in components having high costs and long lead times, and which may not even be possible to fabricate to the tolerances required for high resolution printing.

Using one or more adjustment mechanisms to align the position of a printer component/feature also poses a number of challenges. For example, the adjustment mechanism(s) must have very fine resolution, and the resulting position must be measured to great accuracy. Moreover, many adjustment mechanisms include parts or surfaces that slide against one another or are secured to one another (e.g., using fasteners or screws). This approach limits achievable resolution due to the friction of the opposed surfaces sliding against each other. The inherent over-constraint of two mating surfaces with unavoidable flatness error also results in changes to position when the fasteners, screws, etc. are loosened and re-tightened. Adjustment mechanisms typically require more physical parts and time to perform an alignment.

Accordingly, techniques for more accurately and efficiently replicating the alignment of one or more printer components/features with respect to other printer component(s)/feature(s) (e.g., a printer structure or mechanical interface component) are described herein. While certain embodiments have been described in the context of aligning print head(s) with printer components such as printer structures and mechanical interface components, those skilled in the art will recognize that the replication techniques described herein can be used to precisely arrange/affix nearly any combination of print components/features. Replication may be achieved by using a fixture and connection media (e.g., an epoxy) to create a near exact replica of features of the fixture, or to temporarily hold multiple components in position while a joining layer of the connection media hardens. The replication fixture represents a mechanical mounting interface that can influence the position of printer component/feature (e.g., a print head or an array of print heads) within a printer housing or a printing mechanism.

Such an approach provides several benefits. For example, the replication fixture is not limited to the same design constraints as the end product (e.g., the printer assembly). Therefore, material selection and fabrication methods can be tailored and optimized for the fixture design, while the components being replicated (e.g., the print head, mechanical interface components, and printer structure) can be produced from lower cost materials using relatively low tolerance fabrication methods. This enables printer assembles to be easily created from components that are composed of different material types (e.g., composites and metals) or created using different fabrication design types (e.g., sheet metal, machined, extruded, molded, etc.).

Joining dissimilar printer components in such a manner does not add or change the stresses within the individual printer components, unlike traditional methods that utilize fasteners (e.g., screws) or welding. Instead, a stable mechanical coupling can be formed that does not require post operations, such as stress relieving. Many printer assemblies can be fabricated using a single replication fixture, and all to the near exact tolerance of the replication fixture. Depending on the specific application requirements, replication assembly techniques can accomplish all or most of the position tolerance requirements without the use of alignment mechanisms. This maximizes assembly accuracy and precision, while minimizing costs and complexity.

A connection media, such as epoxy, can be used to fill an intentionally-established gap between connecting bodies or components that are held in a predetermined position by a replication fixture. The accuracy and precision of the replication fixture can be much higher than that which is possible with the components themselves because the replication fixture can be made from a very stable material, such as granite, normalized steel, ceramic, etc. The fixture can also include an assembly of many smaller, high accuracy parts that are aligned and securely fixed to one another. Printer components that are to be connected to one another can be fabricated to relatively low tolerances with the exception of a few precision features that locate each component within the replication fixture. One example of this is a low-cost precision pin.

Embodiments of the technology described herein provide improved accuracy and positioning of a print head with respect to another printer component (e.g., a printer structure or mechanical interface component), thereby resulting in improved image quality. Other benefits include the ability to easily incorporate multiple materials that are tailored to specific requirements of the printer design, a reduction or elimination of the need for different alignment mechanisms (thereby resulting in improved product-output standardization), improvements in manufacturability and serviceability of print head installation and replacement, reductions in the labor skill level required to produce or fabricate accurate and precise printer assemblies, reductions in costs of very accurate and precise printer assemblies, and an ability to create stable mechanical printer assemblies without adding or changing the stresses experienced by individual printer components.

Additional benefits can be realized in both printer component and assembly construction, as well as replication fixture construction, that utilizes materials with a low coefficient of thermal expansion (CTE). CTE is a material property that relates to the magnitude of geometric dimensional change that occurs due to temperature variation. For example, many aluminum alloys have a CTE of ~22 ppm/° C. Meaning that an aluminum bar having length of 1 m, would change by approximately 0.001 mm for each ° C. of temperature change. Aluminum is considered to have a relatively high CTE compared to many other materials commonly used in inkjet printer design. Some examples of low CTE materials include Invar®, ceramics, and carbon fiber. CTE is very important when designing high-accuracy and high-precision components, assemblies, and fixtures, and CTE scales linearly with the size of the components. Accordingly, CTE becomes especially important in large inkjet printer and/or fixture designs as components can be many meters in size, yet require minimal dimension changes over a broad temperature range. The use of low CTE materials in printer component and replication fixture designs reduces their dimensional sensitivity to temperature fluctuations, thus maximizing the possible accuracy and precision that can be accomplished. Thus, printer component(s) and/or replication fixtures may be composed of low CTE materials.

Terminology

Brief definitions of term, abbreviations, and phrases used throughout the application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that the devices do not share a physical connection with one another.

Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for any one or more of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to the various embodiments given in this specification.

System Overview

FIG. 1 depicts a replication fixture 100 that can be used to more accurately fabricate a printer assembly that includes a printer structure 102 (e.g., a print head, a print head plate such as a jet plate or a print bar, a rail beam assembly, a carriage structure, a frame structure, etc.) and one or more mechanical interface components 104 (among other components). While certain components (e.g., print heads) have been used in some embodiments for the purpose of illustration, those skilled in the art will recognize that the replication techniques described herein could be applied to many areas within an inkjet printer, including print head(s), print head plates such as jet plates or print bars, carriage/housing structures, frame structures, rail beam assemblies (e.g., for alignment or creation), rollers (e.g., for geometry or mounting alignments), vacuum tables (e.g., for ensuring surface flatness), transport tables (e.g., for ensuring surface flatness), etc.

The replication fixture 100 represents a tool that includes particular dimensional constraints and a particular geometrical arrangement of features (e.g., cavities and protrusions) that allows a printer assembly to be more accurately fabricated. More specifically, the dimensional constraints and geometrical arrangement of features enable certain printer components (e.g., the printer structure 102 and mechanical interface components 104) to be more precisely connected to one another.

As shown here, the replication fixture 100 can include a substantially planar surface (e.g., a flat surface 106) designed to mate with the mounting surface(s) 108 of the mechanical interface component(s) 104. In some embodiments, the replication fixture includes one or more features that are able to temporarily hold the printer structure 102 and the mechanical interface component(s) 104 in place while an epoxy layer joining those components hardens. For example, the replication fixture 100 may include holes 110 capable of receiving pin(s) 112 disposed along the mounting surface 108 of each mechanical interface component 104 and/or along the bottom of the printer structure 102.

These features enable the replication fixture 100 to hold the mechanical interface component(s) 104 and the printer structure 102 in a predetermined arrangement. For example, the predetermined arrangement may represent the final print head or print head array position. As shown in FIG. 1, these features may include pin(s) 112, hole(s) 110, and mounting surface(s) 108. However, one skilled in the art will recognize that other structural features (e.g., indentations/notches, flanges, kinematic nests, precision surfaces, slots, shoulders, etc.) could also be used to consistently maintain a specific arrangement of printer components.

Because the replication fixture 100 does not have the same constraints (e.g., due to cost or weight) as the printer components, the replication fixture 100 can be made from one or more stable materials, such as granite, carbon fiber, ceramic, metal or metal alloy (e.g., steel), etc. Material selection can instead be tailored and optimized for the fixture design, while the components being affixed to one another (e.g., the print head, mechanical interface components, and printer structure) can be produced from lower cost materials using relatively low tolerance fabrication methods. Accordingly, the repeatability of the replication fixture 100 can consistently produce printer assemblies with acceptable accuracy and tolerance.

Figure 2:
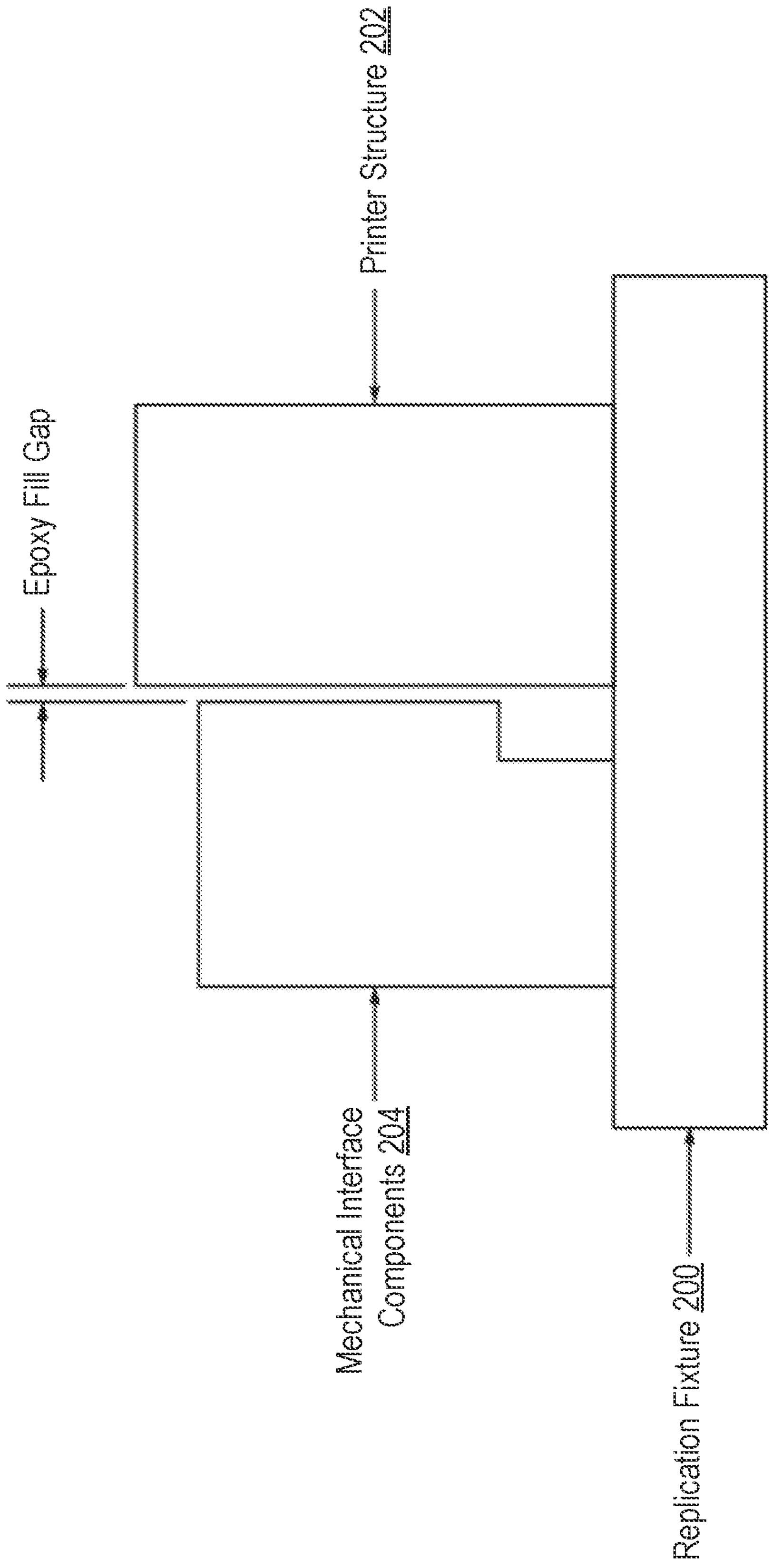
FIG. 2 depicts how a replication fixture can be used to intentionally maintain a predetermined gap between connecting bodies or components that are held in a predetermined position.

FIG. 2 depicts how a replication fixture 200 can be used to intentionally maintain a predetermined gap between connecting bodies or components that are held in a predetermined position. Here, for example, the replication fixture 200 maintains a gap between the printer structure 202 and the mechanical interface component(s) 204 that is subsequently filled with a connection media, such as an epoxy. The replication fixture 200 can secure various support structure components of a printer (e.g., jet plate, bar, beam, carriage/housing, etc.) in position with an intentional epoxy fill gap.

Once the printer component(s) are secured to the replication fixture 200, the gap can be filled with the connection media. As further described below, the gap can be filled with the connection media through various methods, such as brush-on, spray, injection, etc. As noted above, the accuracy and precision of the replication fixture 200 can be much higher than that which is possible with the printer components themselves. In fact, significant variations in the gap may be acceptable, which allows features of the printer components to have generous tolerances.

Together, the printer structure 202 and the mechanical interface component(s) 204 form a print head mounting structure that can be used to more accurately mount a print head within a printer. Once the connection media has fully cured, the print head mounting structure can be removed from the replication fixture 200 as a single piece, and the resulting position of the critical printer components is nearly as accurate as the replication fixture 200. Joining the printer components in such a manner does not add or change the stresses within the individual printer components, unlike traditional methods that utilize fasteners (e.g., screws) or welding. Instead, the replication fixture 200 enables a stable mechanical coupling to be formed that does not require post operations, such as stress relieving. The stable mechanical coupling can also result in long-term stability and geometric accuracy of the assembly.

Figure 3:
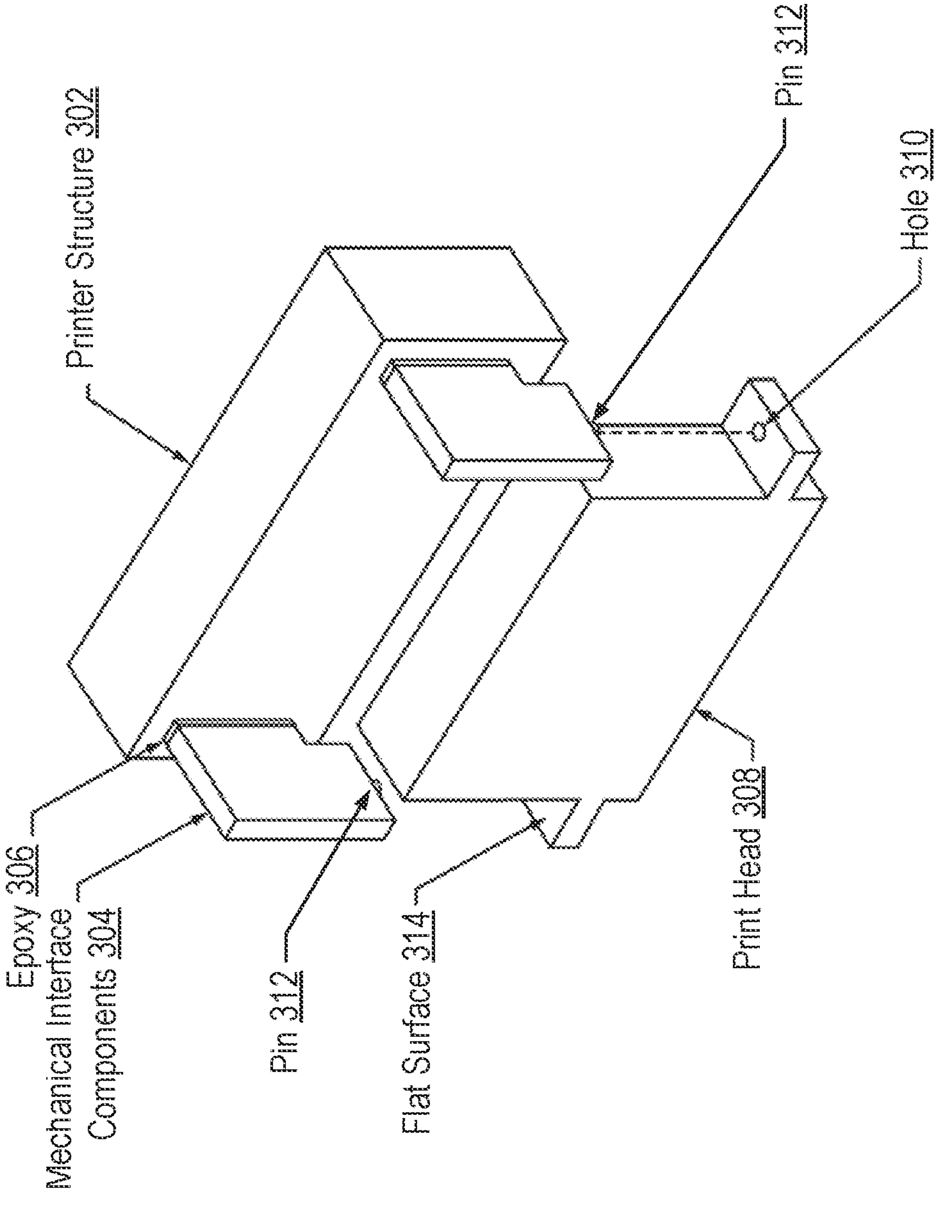
FIG. 3 depicts how a print head mounting structure can be accurately and efficiently attached to a print head.

FIG. 3 depicts one possible way a print head mounting structure can be accurately and efficiently attached to a print head 308. The print head mounting structure can include a printer structure 302 and one or more mechanical interface components 304 (among other components) that are affixed to one another via an epoxy 306.

Because the print head mounting structure has been fabricated using a replication fixture, one or more print heads 308 can be readily positioned within the print head mounting structure with improved accuracy and precision. For example, a print head 308 may include a series of surfaces and/or features that are designed to readily mate with components of the print head mounting structure.

Here, for example, the print head 308 includes hole(s) 310 that can be installed onto pin(s) 312 that are disposed along the mounting surface of the printer structure 302 and/or the mechanical interface component(s) 304. Similarly, the print head 308 may include certain dimensional or geometrical characteristics/features that allow the print head 308 to be easily coupled to the print head mounting structure. Here, for example, the print head 308 includes flanges having flat surfaces 314 that be arranged substantially flush with the mounting surfaces of the mechanical interface component(s) 304.

Figure 4:
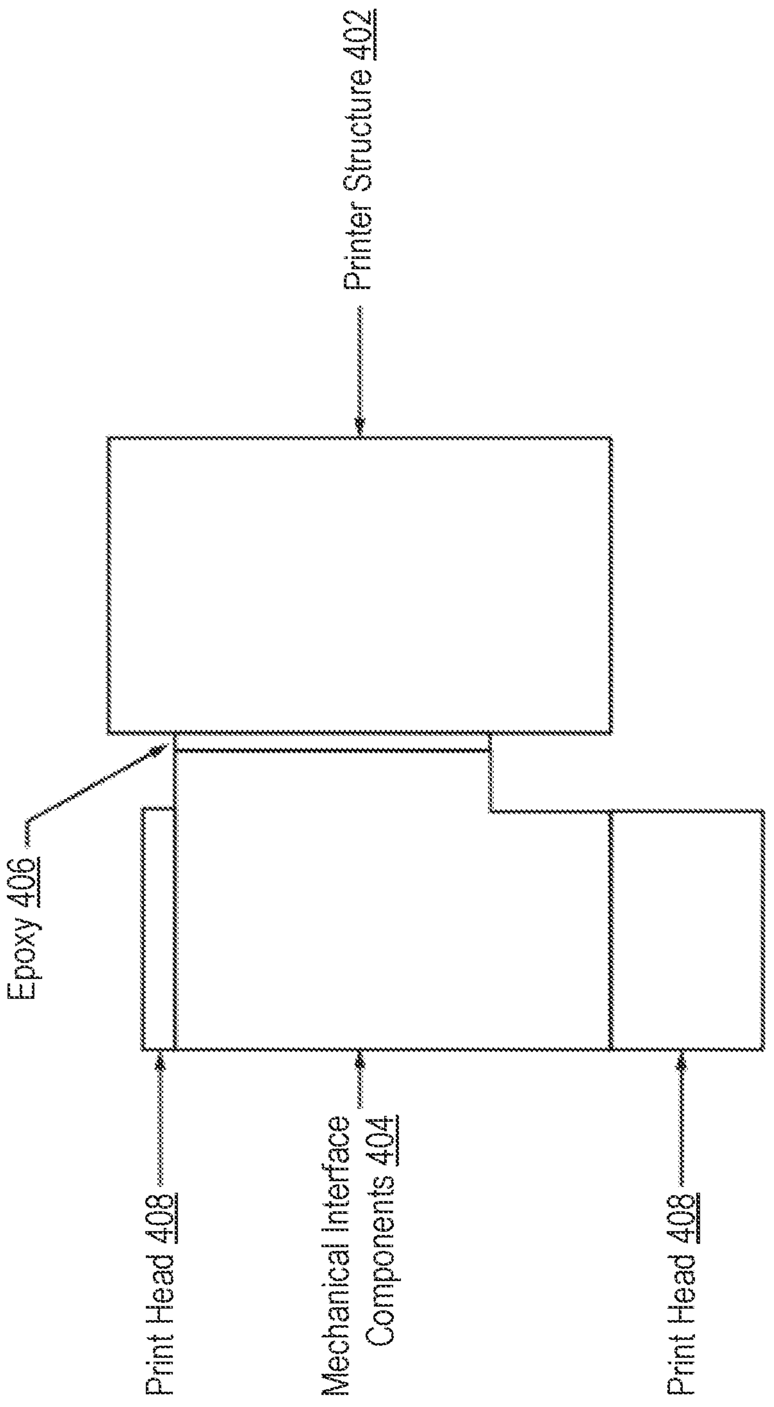
FIG. 4 is a side view of a print head that has been installed within a print head mounting structure, which includes a printer structure securely affixed to one or more mechanical interface components by an epoxy layer.

FIG. 4, meanwhile, is a side view of a print head 408 that has been installed within a print head mounting structure, which includes a printer structure 402 securely affixed to one or more mechanical interface components 404 by an epoxy layer 406. Together, the print head 408 and the print head mounting structure form a printer assembly that can be disposed within a printer carriage (also referred to as a "housing") or connected to some other structural printer component.

Depending on the specific application requirements, the replication assembly techniques described herein can satisfy all or most of the position tolerance requirements of the printer assembly without the use of conventional alignment mechanisms. Such techniques maximize printer assembly accuracy and precision, while minimizing costs and complexity.

Figure 5:
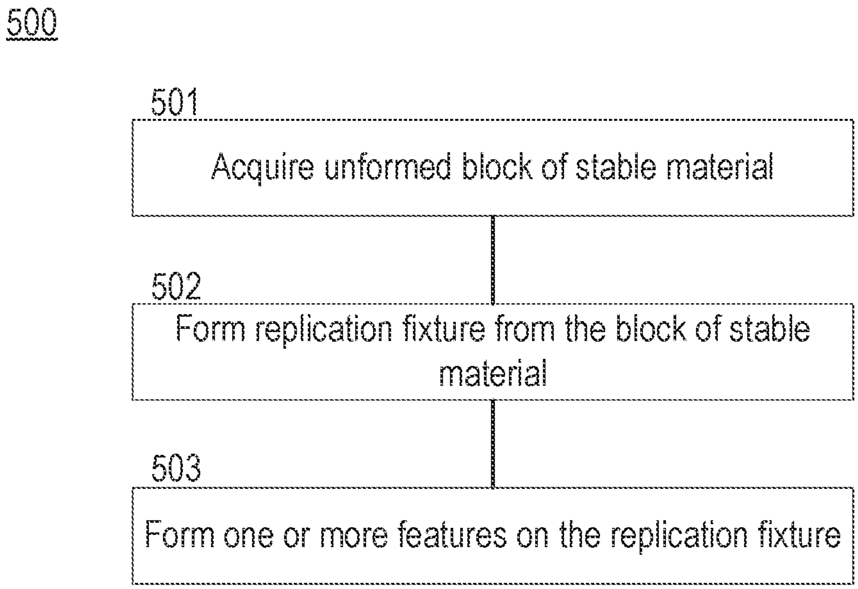
FIG. 5 depicts a process for manufacturing a replication fixture that can be used to fabricate printer assemblies.

FIG. 5 depicts a process 500 for manufacturing a replication fixture that can be used to fabricate printer assemblies. An unformed block of stable material is initially acquired (step 501). Alternatively, a replication fixture could be formed by a collection of multiple components, blocks, etc. The stable material could include, for example, granite, carbon fiber, ceramic, steel, or some combination thereof. Selecting material(s) having a low CTE property will reduce dimensional sensitivity to temperature variations. High stability ensures that the replication fixture can be repeatedly used to produce printer assemblies having the tolerances required for high resolution printing.

The replication fixture is then formed from the block (or collection of components/blocks) of stable material (step 502). For example, the replication fixture may be produced using very accurate machine tools, jig grinding, surface grinding, hand lapping, etc. Because these tools and processes are expensive, such techniques are typically avoided when producing production parts (e.g., individual printer components). However, such techniques are desirable when fabricating the replication fixture, which is intended to be repeatedly used over a longer period of time. Again, low CTE materials may be selected to maximize the possible accuracy and precision that can be achieved.

One or more features (e.g., cavities and protrusions) are then formed on the replication fixture (step 503). These feature(s) allow printer assemblies to be more accurately fabricated. More specifically, the feature(s) can be used to hold multiple printer components in a predetermined arrangement within the replication fixture (also referred to as a "jig") while a connection media (e.g., an epoxy) between those printer components hardens. Alternatively, the replication fixture may an assembly of multiple smaller, high accuracy parts that are aligned and securely fixed to one another. Because the replication fixture has been designed and manufactured to such high standards, the printer components that are to be connected to one another can be fabricated to slightly lower/looser tolerances.

Figure 6:
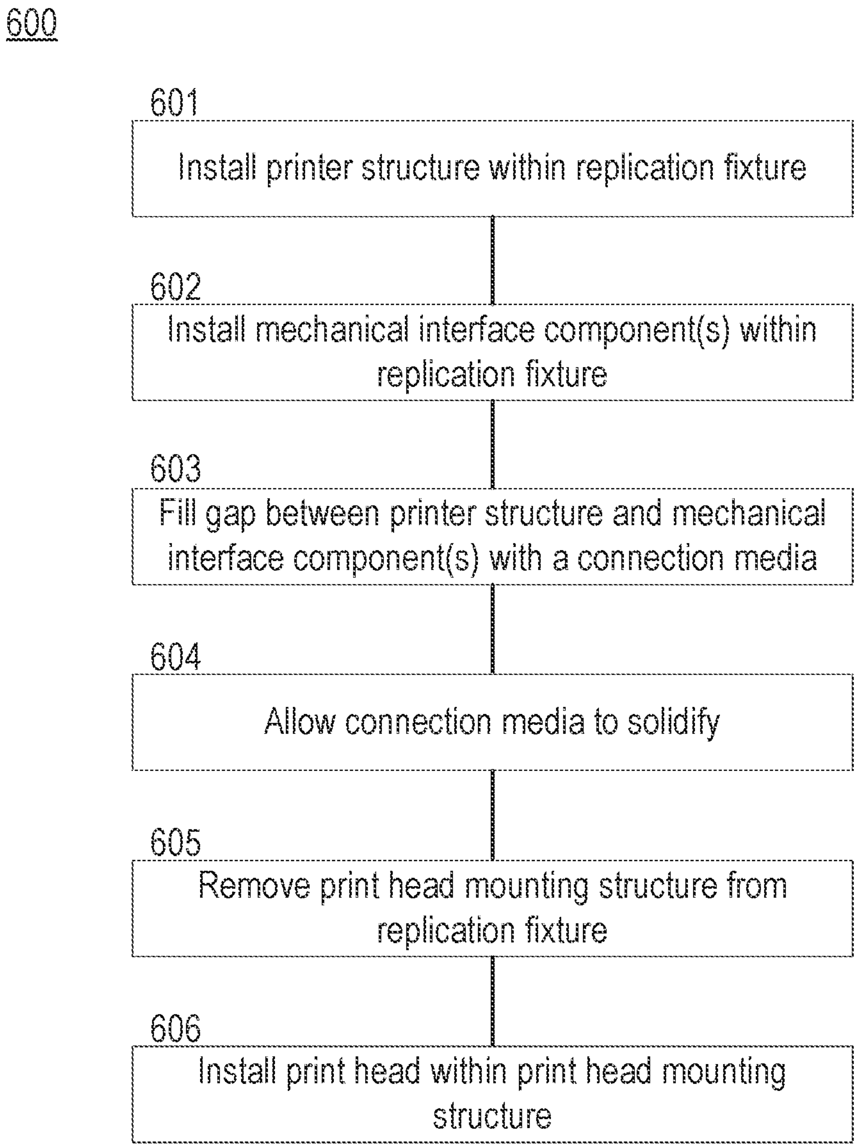
FIG. 6 depicts a process for installing a print head within a print head mounting structure that includes a printer structure and one or more mechanical interface components.

FIG. 6 depicts a process 600 for installing a print head within a print head mounting structure that includes a printer structure and one or more mechanical interface components.

A printer structure and one or more mechanical interface components are initially installed within a replication fixture (steps 601 and 602). As noted above, the replication fixture can include a flat surface that is designed to mate with mounting surfaces of the printer structure and/or the mechanical interface component(s). Moreover, the replication fixture may include one or more features that are arranged to temporarily hold the printer structure and the mechanical interface component(s) in a predetermined arrangement. For example, the replication fixture may include a series of holes (e.g., three or four separate holes) that are configured to receive pin(s) disposed along an outer surface of each mechanical interface component and/or the printer structure. Note, however, that the replication fixture could include other features as well, such as indentations/notches, flanges, kinematic nests, slots, shoulders, etc.

The predetermined arrangement of features causes a gap to exist to between some of the printer components. For example, the replication fixture of FIGS. 1-2 causes a gap to be intentionally left between the printer structure and the mechanical interface component(s). This gap can be filled with a connection media that fixedly binds these printer components together (step 603). For example, in some embodiments the connection media is an epoxy that ensures very accurate replication of the positioning of components of a printer assembly.

Different types of epoxy can be used, including two-part mixtures, filled mixtures, unfilled mixtures, etc. The epoxy may also be curable using air, heat, ultraviolet (UV) radiation, etc. Epoxies that are highly filled (e.g., greater than 95% filled with a material having similar properties as the bonding surface) are generally desired. For example, if the printer structure and the mechanical interface component(s) are made of steel, then an epoxy may be used that is filled with a steel powder. Such a design ensures that the adjoining epoxies have a similar expansion coefficient as one or both of the bodies being joined (e.g., the printer structure and/or the mechanical interface component(s)). As another example, if the printer structure and/or mechanical interface component(s) are composed of a ceramic or mineral-based material (e.g., granite or carbon fiber), an epoxy may be used that is filled with a mineral-based material. Such a technique ensures that the printer structure and the mechanical interface component(s) are securely bonded to one another by the epoxy, while being the print head mounting structure remains easily detachable from the replication fixture.

The connection media is then cured or allowed to solidify (step 604). Although the connection media is often a liquid epoxy resin, the connection media could also be a solid epoxy resin (e.g., applied as a powder coat). Therefore, as noted above, this may require that a sufficient period of time be allowed to expire or that some other action is taken (e.g., exposing the epoxy to a curing assembly that includes one or more ultraviolet light sources, fans, heaters, etc.). Moreover, the connection media may be allowed to "solidify" even though it may change state from a liquid to a semi-solid to a solid via multiple mechanisms. Accordingly, the connection media could be flexible, compliant, or conforming in its initial state.

Together, the printer structure and mechanical interface component(s) combine to form a print head mounting structure. After the epoxy has hardened, the print head mounting structure can be removed from the replication fixture (step 605), and a print head can be installed within the print head mounting structure (step 606). For example, the print head may include features (e.g., holes or indentations) that are designed to mate with corresponding features of the print head mounting structure (e.g., pins or protrusions disposed along the outer surface of the printer structure and/or mechanical interface component(s)).

Unless contrary to physical possibility, it is envisioned that the steps described above may be performed in various sequences and combinations. Other steps could also be included in some embodiments. For example, the print head could be installed within the print head mounting structure while the print head mounting structure is still detachably connected to the replication fixture.

REMARKS

The above description of various embodiments has been provided for the purposes of illustration and description. It is not intended to be exhaustive or to limit the claimed subject matter to the precise forms disclosed. Many modifications and variations will be apparent to one skilled in the art. One skilled in the relevant technology will also understand that some of the embodiments may include other features that are not described in detail herein. Some well-known structures or functions may not be shown or described in detail below, to avoid unnecessarily obscuring the relevant descriptions of the various examples.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

I claim:

1. A method for connecting first and second components using a replication fixture, the method comprising:

securing the first component to a first structural feature that is accessible along a surface of the replication fixture;

securing the second component to a second structural feature that is accessible along the surface of the replication fixture;

causing a gap between with the first and second components to be filled with a connection media; and removing the first and second components, as a single unit to be installed in a printer, from the replication fixture after the connection media hardens.

2. The method of claim 1, further comprising:

causing the connection media to be cured, so as to form the single unit that includes the first and second components with the connection media therebetween.

3. The method of claim 1, wherein the connection media is an epoxy resin.

4. The method of claim 1, wherein the connection media includes a fill material that has an expansion coefficient that is substantially similar to an expansion coefficient of the first component and/or the second component.

5. The method of claim 1, wherein the first structural feature is designed to accommodate a complementary structural feature of the first component, and wherein the second structural feature is designed to accommodate a complementary structural feature of the second component.

6. The method of claim 5, wherein at least one of the complementary structural features of the first and second components is to be used to install the single unit in the printer.

7. A fixture to be used to align components during manufacture of an item to be installed in a printer, the fixture comprising:

a rigid structure having a surface along which a first structural feature and a second structural feature are accessible, wherein the first and second structural features are positioned such that a gap is established between a first component that is secured to the first structural feature and a second component that is secured to the second structural feature, and wherein the gap is fillable with a connection media that, upon hardening, allows the first and second components to be removed, as a single unit, from the rigid structure.

8. The fixture of claim 7, wherein the rigid structure comprises granite, carbon fiber, ceramic, metal, or some combination thereof.

9. The fixture of claim 7, wherein the first and second structural features are indentations, notches, flanges, kinematic nests, slots, shoulders, or some combination thereof.

10. The fixture of claim 7, wherein the first and second structural features are holes along the surface of the rigid structure, wherein the first component includes a pin to be received in one of the holes, and wherein the second component includes another pin to be received another one of the holes.

11. The fixture of claim 7, wherein the rigid structure comprises a stable material so as to allow hardening of the connection media through exposure to heat while the first and second components are installed on the rigid structure.

12. The fixture of claim 7, wherein the rigid structure has a rectangular prism shape.

13. The fixture of claim 7, wherein the surface is planar.

14. The fixture of claim 7, wherein the surface is designed to become flush with surfaces of the first and second components when secured to the rigid structure.

15. A method for forming a multi-component unit to be installed in a printer, the method comprising:

securing a first component to a first structural feature that is accessible along a surface of a rigid fixture;

securing a second component to a second structural feature that is accessible along the surface of the rigid fixture; and causing a gap between the first and second components to be filled with a connection media that, upon hardening, joins the first and second components to form the multi-component unit.

16. The method of claim 15, further comprising:

removing the multi-component unit for installation in the printer.

17. The method of claim 16, wherein the first structural feature is designed to accommodate a complementary structural feature of the first component, wherein the second structural feature is designed to accommodate a complementary structural feature of the second component, and wherein the complementary structural feature of the first component and/or the complementary structural feature of the second component is used to install the multi-component unit in the printer.

18. The method of claim 15, further comprising:

curing the connection media by exposing the rigid fixture, with the first and second components secured thereto, to a heat source.

19. The method of claim 15, further comprising:

curing the connection media by exposing the rigid fixture, with the first and second components secured thereto, to a dryer.

20. The method of claim 15, further comprising:

curing the connection media by allowing a period of time to lapse during which the connection media hardens.

* * * * *